(12) United States Patent
Wang et al.

(10) Patent No.: US 12,474,763 B2
(45) Date of Patent: Nov. 18, 2025

(54) PROCESSOR POWER MANAGEMENT UTILIZING DEDICATED DMA ENGINES

(71) Applicant: Advanced Micro Devices, Inc., Santa Clara, CA (US)

(72) Inventors: Ling-Ling Wang, Santa Clara, CA (US); Yuan Du, Shanghai (CN); ZengRong Huang, Shanghai (CN); HaiKun Dong, Beijing (CN); LingFei Shi, Shanghai (CN); Wei Shao, Beijing (CN); XiaoJing Ma, Shanghai (CN); Qian Zong, Shanghai (CN); Shenyuan Chen, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 148 days.

(21) Appl. No.: 17/490,003

(22) Filed: Sep. 30, 2021

(65) Prior Publication Data

US 2023/0098742 A1    Mar. 30, 2023

(51) Int. Cl.
*G06F 1/00* (2006.01)
*G06F 1/3296* (2019.01)
*G06F 9/48* (2006.01)
*G06F 13/28* (2006.01)

(52) U.S. Cl.
CPC .......... *G06F 1/3296* (2013.01); *G06F 9/4893* (2013.01); *G06F 13/28* (2013.01)

(58) Field of Classification Search
CPC ...... G06F 1/3296; G06F 9/4893; G06F 13/28; G06F 1/3275; Y02D 10/00
See application file for complete search history.

(56) References Cited

U.S. PATENT DOCUMENTS

| | | | |
|---|---|---|---|
| 5,740,454 A | 4/1998 | Kelly et al. | |
| 6,085,330 A | 7/2000 | Hewitt et al. | |
| 6,125,450 A | 9/2000 | Kardach | |
| 6,292,865 B1 | 9/2001 | McTague et al. | |
| 6,446,215 B1 | 9/2002 | Meyer et al. | |
| 6,981,072 B2 * | 12/2005 | Day | G06F 12/1081 710/308 |
| 7,330,991 B2 * | 2/2008 | Au | G06F 13/28 713/400 |
| 8,584,067 B2 | 11/2013 | Osborn et al. | |
| 10,896,142 B2 * | 1/2021 | Osawa | G06F 12/0246 |

(Continued)

*Primary Examiner* — Xuxing Chen
(74) *Attorney, Agent, or Firm* — Kowert, Hood, Munyon, Rankin & Goetzel, P.C.; Rory D. Rankin

(57) ABSTRACT

Apparatuses, systems and methods for performing efficient power management for a processing unit. A processing unit includes two partitions, each assigned to a respective power domain with operating parameters, and each with a respective direct memory access (DMA) engine. If a controller determines a task type of a received task indicates the task is to be processed by components of the second partition, then the controller assigns the task to the second partition and maintains the operational parameters of the first power domain for the components of the first partition or selects lower performance operational parameters of the first power domain. The processing unit accesses data stored in memory using a DMA engine and operational parameters of the second partition. Additionally, the second partition processes the task using the operational parameters of the second power domain.

20 Claims, 6 Drawing Sheets

(56) References Cited

U.S. PATENT DOCUMENTS

| | | | | |
|---|---|---|---|---|
| 11,556,382 B1* | 1/2023 | Byagowi | | G06F 9/4881 |
| 2008/0126652 A1* | 5/2008 | Vembu | | G06F 13/24 |
| | | | | 710/268 |
| 2008/0168255 A1* | 7/2008 | Abou-Emara | | G06F 15/16 |
| | | | | 712/28 |
| 2009/0222654 A1* | 9/2009 | Hum | | G06F 1/3203 |
| | | | | 713/323 |
| 2013/0111270 A1* | 5/2013 | Kimura | | G06F 11/3664 |
| | | | | 714/E11.178 |
| 2013/0205126 A1* | 8/2013 | Kruglick | | G06F 9/4405 |
| | | | | 713/1 |
| 2014/0068284 A1* | 3/2014 | Bhandaru | | G06F 1/3206 |
| | | | | 713/300 |
| 2014/0310467 A1* | 10/2014 | Shalf | | G06F 15/7825 |
| | | | | 711/119 |
| 2014/0380003 A1* | 12/2014 | Hsu | | G06F 9/5033 |
| | | | | 718/102 |
| 2015/0186311 A1* | 7/2015 | Yap | | G06F 1/3225 |
| | | | | 710/308 |
| 2016/0011645 A1* | 1/2016 | Min | | G06F 1/3287 |
| | | | | 713/322 |
| 2016/0216751 A1* | 7/2016 | Kim | | G06F 1/3206 |
| 2016/0292101 A1* | 10/2016 | Egi | | G06F 13/4282 |
| 2016/0321094 A1* | 11/2016 | Rabi | | G06F 9/45558 |
| 2016/0379334 A1* | 12/2016 | Wu | | G06T 7/50 |
| | | | | 345/582 |
| 2018/0052499 A1* | 2/2018 | Bose | | G06F 1/3206 |
| 2018/0203733 A1* | 7/2018 | Tajima | | G06F 13/28 |
| 2018/0210532 A1* | 7/2018 | Zhang | | G06F 1/324 |
| 2019/0065243 A1* | 2/2019 | Eckert | | G06F 1/3225 |
| 2019/0163255 A1* | 5/2019 | Dewey | | G06F 13/4221 |
| 2020/0226093 A1* | 7/2020 | Butcher | | G06F 9/5038 |
| 2020/0285584 A1* | 9/2020 | Srinivas | | G06F 12/0897 |
| 2021/0011759 A1* | 1/2021 | Park | | G06F 11/3024 |
| 2021/0303054 A1* | 9/2021 | Zhu | | G06F 1/3206 |
| 2021/0311629 A1* | 10/2021 | Pappachan | | G06F 3/062 |
| 2022/0058029 A1* | 2/2022 | Mubeen | | G06F 9/4403 |

* cited by examiner

PROCESSOR POWER MANAGEMENT UTILIZING DEDICATED DMA ENGINES

BACKGROUND

Description of the Relevant Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for desktop computers and servers utilizing high-performance microprocessors. These microprocessors include multiple processor cores, or cores, and multiple pipelines within a core.

A variety of computing devices, such as a variety of servers, utilize heterogeneous integration, which integrates multiple types of ICs for providing system functionality. The multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for system packaging to integrate the multiple types of ICs. In some computing devices, a system-on-a-chip (SOC) is used, whereas, in other computing devices, smaller and higher-yielding chips are packaged as large chips in multi-chip modules (MCMs).

Some computing devices include three-dimensional integrated circuits (3D ICs) that utilize die-stacking technology as well as silicon interposers, through silicon vias (TSVs) and other mechanisms to vertically stack and electrically connect two or more dies in a system-in-package (SiP). Regardless of the choice for system packaging, as the system scales to increase performance, the number of sockets increase, and powering down the computing system with the multiple sockets, each with a copy of the selected package, becomes more complicated.

In view of the above, efficient methods and systems for performing efficient power management for a processing unit are desired.

Figure 1:
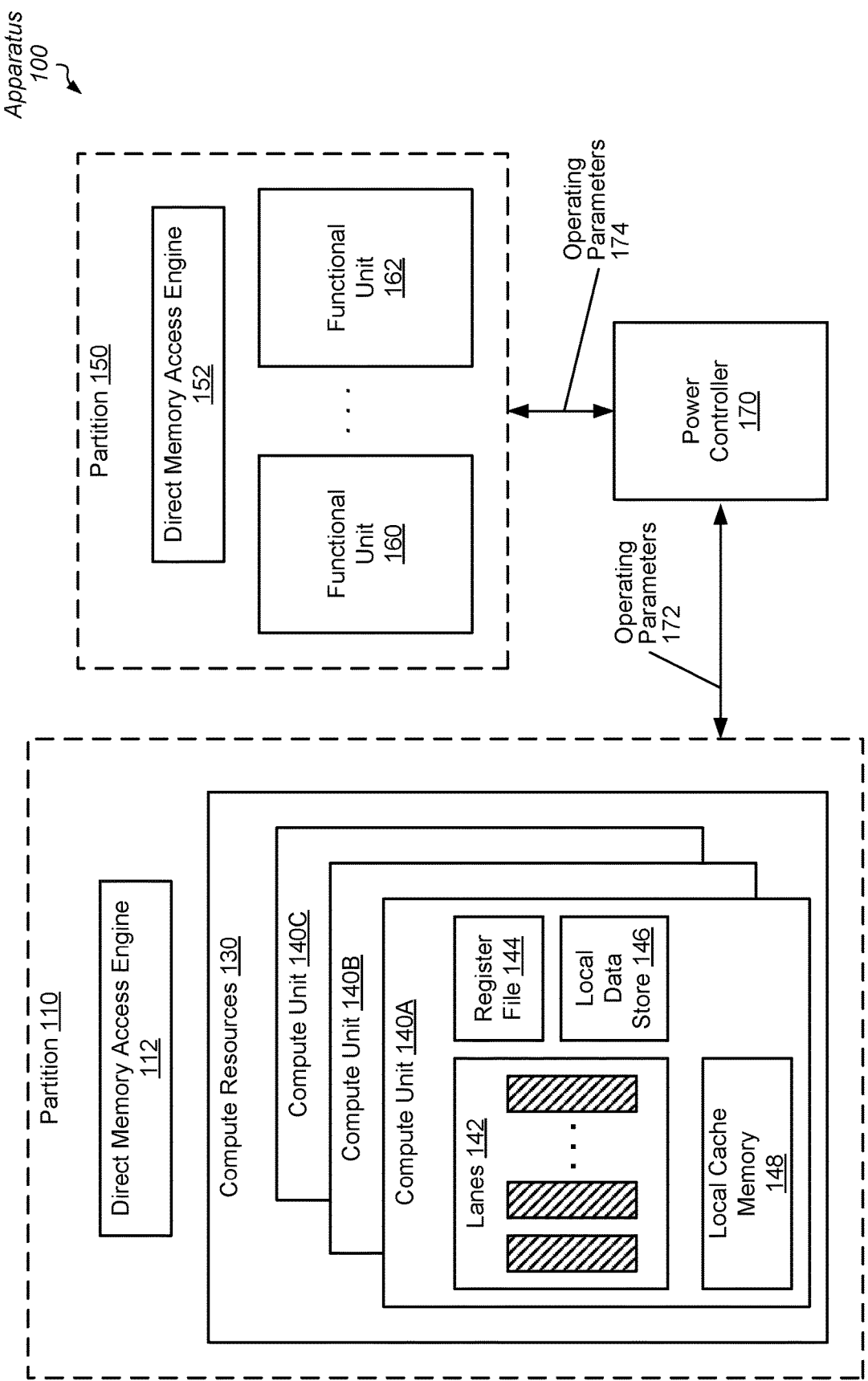
FIG. 1 is a generalized diagram of an apparatus that efficiently manages power consumption.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses, systems and methods for efficiently managing power consumption of a processing unit are contemplated. In various embodiments, a processing unit includes two partitions, each assigned to a respective power domain. Each of the power domains includes operating parameters such as at least an operating power supply voltage and an operating clock frequency. In some embodiments, circuitry of the first partition includes multiple compute units, each with multiple lanes of execution. The first partition also includes a first direct memory access (DMA) engine. The first DMA engine transfers data between external memory and components of the first partition such as the multiple compute units. Circuitry of the second partition includes a second DMA engine and a functional unit different from a compute unit of the multiple compute units. The second DMA engine transfers data between external memory and components of the second partition such as the functional unit.

The processing unit includes a controller that uses circuitry to receive tasks and assign the received task to one of the two partitions based on a task type of the received task. If the circuitry of the controller determines the task type indicates a received task is to be processed by the multiple compute units, then the controller assigns the task to the first partition. The processing unit accesses data stored in memory with the first DMA engine using operational parameters of the first power domain. Additionally, the multiple compute units process the task using the operational parameters of the first power domain.

If the controller determines the task type indicates a received task is to be processed by the functional unit, then the controller assigns the task to the second partition. The controller maintains the operational parameters of the first power domain for the multiple compute units and the first DMA engine of the first partition. In some embodiments, the controller selects lower performance operational parameters of the first power domain for the first partition. The processing unit accesses data stored in memory with the second DMA engine using operational parameters of the second power domain. Additionally, the functional unit processes the task using the operational state of the second power domain. In various embodiments, the processing unit is a graphics processing unit (GPU) and the controller is a command processor of the GPU. The multiple compute units of the first partition process tasks such as a graphics shader task. The functional unit of the second partition processes tasks such as a multimedia playback task, such as a video decoder task, a power up initialization task, and so forth.

Referring to FIG. 1, a generalized block diagram of one embodiment of an apparatus 100 that efficiently manages power consumption is shown. In the illustrated embodiment, the apparatus 100 includes two partitions, such as partition 110 and partition 150, each assigned to a respective power domain. Each of the power domains includes at least operating parameters such as at least an operating power supply voltage and an operating clock frequency. Each of the power domains also includes control signals for enabling and disabling connections to clock generating circuitry and a power supply reference. Partition 110 receives operating parameters 172 of a first power domain from power controller 170, and partition 150 receives operating parameters 174 of a second domain from power controller 170. Each of the partitions 110 and 150 includes components for processing tasks. Partition 110 includes the direct memory access (DMA) engine 112 and compute resources 130. Partition 150 includes the DMA engine 152 and functional units 160-162. A communication fabric, a memory controller, interrupt controllers, and phased locked loops (PLLs) or other clock generating circuitry are not shown for ease of illustration. In some embodiments, the functionality of the apparatus 100 is included as components on a single die such as a single integrated circuit. In an embodiment, the functionality of the apparatus 100 is included as one die of multiple dies on a system-on-a-chip (SOC). In various embodiments, the apparatus 100 is used in a desktop, a portable computer, a mobile device, a server, a peripheral device, or other.

Direct memory access (DMA) engine 112 accesses memory, such as system memory, independent of another processor such as a processor core of an external central processing unit (CPU), an external digital signal processor (DSP), or compute resources 130. The external CPU, any external DSP, and the compute resources 130 are able to process other tasks while the DMA engine 112 performs memory access operations. The DMA engine 112 includes circuitry and sequential elements that support one or more channels for transmitting memory access operations and receiving memory access responses. Besides system memory, the DMA engine 112 is also capable of transferring data with another device such as another processing unit, a hub, a peripheral device, and so forth. The circuitry of the DMA engine 112 also supports one or more communication protocols used by system memory, compute resources 130, other peripheral devices, one or more hubs, and so forth. The circuitry of the DMA engine 112 is also capable of generating an interrupt and sending it to one or more of the external CPU and the compute resources 130 when the memory access operations have completed, supporting interrupt coalescing, supporting asynchronous data transfers, supporting burst mode data transfers, and so forth. Although partition 110 is shown to include the single DMA engine 112, in other embodiments, the partition 110 includes another number of DMA engines.

In various embodiments, the apparatus 100 uses a parallel data micro-architecture that provides high instruction throughput for a computationally intensive task. In one embodiment, the apparatus 100 uses one or more processor cores with a relatively wide single instruction multiple data (SIMD) micro-architecture to achieve high throughput in highly data parallel applications. Each object is processed independently of other objects, but the same sequence of operations is used. In one embodiment, the apparatus 100 is a graphics processing unit (GPU). Modern GPUs are efficient for data parallel computing found within loops of applications, such as in applications for manipulating and displaying computer graphics, molecular dynamics simulations, finance computations, and so forth. The highly parallel structure of GPUs makes them more effective than general-purpose central processing units (CPUs) for a range of complex algorithms.

The apparatus 100 uses the circuitry of compute resources 130 of partition 110 to process tasks such as highly data parallel applications. The compute resources 130 includes the multiple compute units 140A-140C, each with multiple lanes 142. Each lane is also referred to as a SIMD unit or a SIMD lane. In some embodiments, the lanes 142 operate in lockstep. In various embodiments, the data flow within each of the lanes 142 is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the computation units within a given row across the lanes 142 is the same computation unit. Each of these computation units operates on a same instruction, but different data associated with a different thread.

As shown, each of the compute units 140A-140C also includes a respective register file 144, a local data store 146 and a local cache memory 148. In some embodiments, the local data store 146 is shared among the lanes 142 within each of the compute units 140A-140C. In other embodiments, a local data store is shared among the compute units 140A-140C. Therefore, it is possible for one or more of lanes 142 within the compute unit 140a to share result data with one or more lanes 142 within the compute unit 140b based on an operating mode.

Although an example of a single instruction multiple data (SIMD) micro-architecture is shown for the compute resources 130, other types of highly parallel data micro-architectures are possible and contemplated. The high parallelism offered by the hardware of the compute resources 130 is used for simultaneously rendering multiple pixels, but it is also capable of simultaneously processing the multiple data elements of the scientific, medical, finance, encryption/decryption and other computations.

The circuitry of DMA engine 152 provides the same functionality as the DMA engine 112. The functional units 160-162 include one or more of a video decoder for encoded movies, a display controller, and other functional units. In some embodiments, the partition 110 is used for real-time data processing, whereas, the partition 150 is used for non-real-time data processing. Examples of the real-time data processing are rendering multiple pixels, image blending, pixel shading, vertex shading, and geometry shading. Examples of the non-real-time data processing are multimedia playback, such as a video decoding for encoded audio/video streams, image scaling, image rotating, color space conversion, power up initialization, background processes such as garbage collection, and so forth.

Circuitry of a controller (not shown) receives tasks via one of the DMA engine 112, the DMA engine 152 and a memory controller (not shown). In some embodiments, the controller is a command processor of a GPU, and the task is a sequence of commands (instructions) of a function call of an application. The controller assigns a task to one of the two partitions 110 and 150 based on a task type of the received task. In an implementation, as described earlier, the partition 110 is used for real-time data processing, whereas, the partition 150 is used for non-real-time data processing. If the controller determines the task type indicates a received task is to be processed by the compute resources 130, then the controller assigns the task to the partition 110. The partition 110 accesses data stored in memory with the DMA engine 112 using the operational parameters 172 of a first power domain. Additionally, the compute units 140A-140C process the task using the operational parameters 172.

If the controller determines the task type indicates a received task is to be processed by one of the functional units 160-162, then the controller assigns the task to the partition 150. The power controller 170 maintains the operational parameters 172 of the first power domain for the partition 110. In some embodiments, the power controller 170 selects lower performance operational parameters 172 of the first power domain to send to the partition 110. For example, if the first partition 110 is finishing a task or has no tasks to process while the partition 150 processes a task, then the power controller 170 reduces power consumption by selecting the lower performance operating parameters 172. The assigned one of the functional units 160-162 accesses data stored in memory with the DMA engine 152 using the operational parameters 174 of the second power domain. Additionally, the assigned one of the functional units 160-162 processes the task using the operational parameters 174.

In some embodiments, the power controller 170 is an integrated controller as shown, whereas, in other embodiments, the power controller 170 is an external unit. In one embodiment, power controller 170 collects data from components of the apparatus 100. In some embodiments, the collected data includes predetermined sampled signals.

The switching of the sampled signals indicates an amount of switched capacitance. Examples of the selected signals to sample include clock gater enable signals, bus driver enable signals, mismatches in content-addressable memories (CAM), CAM word-line (WL) drivers, and so forth. In an embodiment, power controller 170 collects data to characterize power consumption in apparatus 100 during given sample intervals.

In some embodiments, on-die current sensors and temperature sensors in apparatus 100 also send information to power controller 170. Power controller 170 uses one or more of the sensor information, a count of issued instructions or issued threads, and a summation of weighted sampled signals to estimate power consumption for the apparatus 100. Power controller 170 decreases (or increases) power consumption if apparatus 100 is operating above (below) a threshold limit. In some embodiments, power controller 170 selects a respective power management state for each of the partitions 110 and 150. As used herein, a "power management state" is one of multiple "P-states," or one of multiple power-performance states that include operational parameters such as an operational clock frequency and an operational power supply voltage.

In various embodiments, the power controller 170 also disables and later re-enables functional units such as disabling and later re-enabling connections to a power supply voltage or a clock generating source. In some embodiments, the power controller supports the Advanced Configuration and Power Interface (ACPI) specification. Therefore, the power controller 170 is capable of sending control signals to components of apparatus 100 to remove connection from a transitioning clock signal and a connection from a power supply reference. The power controller 170 is further capable of sending control signals to components of apparatus 100 to reestablish connection to the transitioning clock signal and a connection to the power supply reference.

In an example, the apparatus 100 receives a task when the power controller 170 has already transitioned the operating parameters 172 of the partition 110 and the operating parameters 174 to low performance operating parameters and/or disconnected one or more of the transitioning clock signal and power supply reference. The controller of the apparatus 100 determines the task has a task type corresponding to the partition 150 such as a non-real-time data processing task type. The controller assigns the task to the partition 150, and the power controller 170 transitions the operating parameters 174 to higher performance operating parameters. The power controller 170 also reconnects any disconnections of one or more of the transitioning clock signal and power supply reference for the partition 150. The power controller 170 maintains, for the partition 110, the low performance operating parameters and/or the disconnections of one or more of the transitioning clock signal and power supply reference. Since the partition 150 has its own dedicated DMA engine 152, the partition 150 does not rely on the DMA engine 112 of partition 110. Accordingly, the partition 110 remains powered down due to remaining idle, and power consumption of apparatus 100 is reduced.

Figure 2:
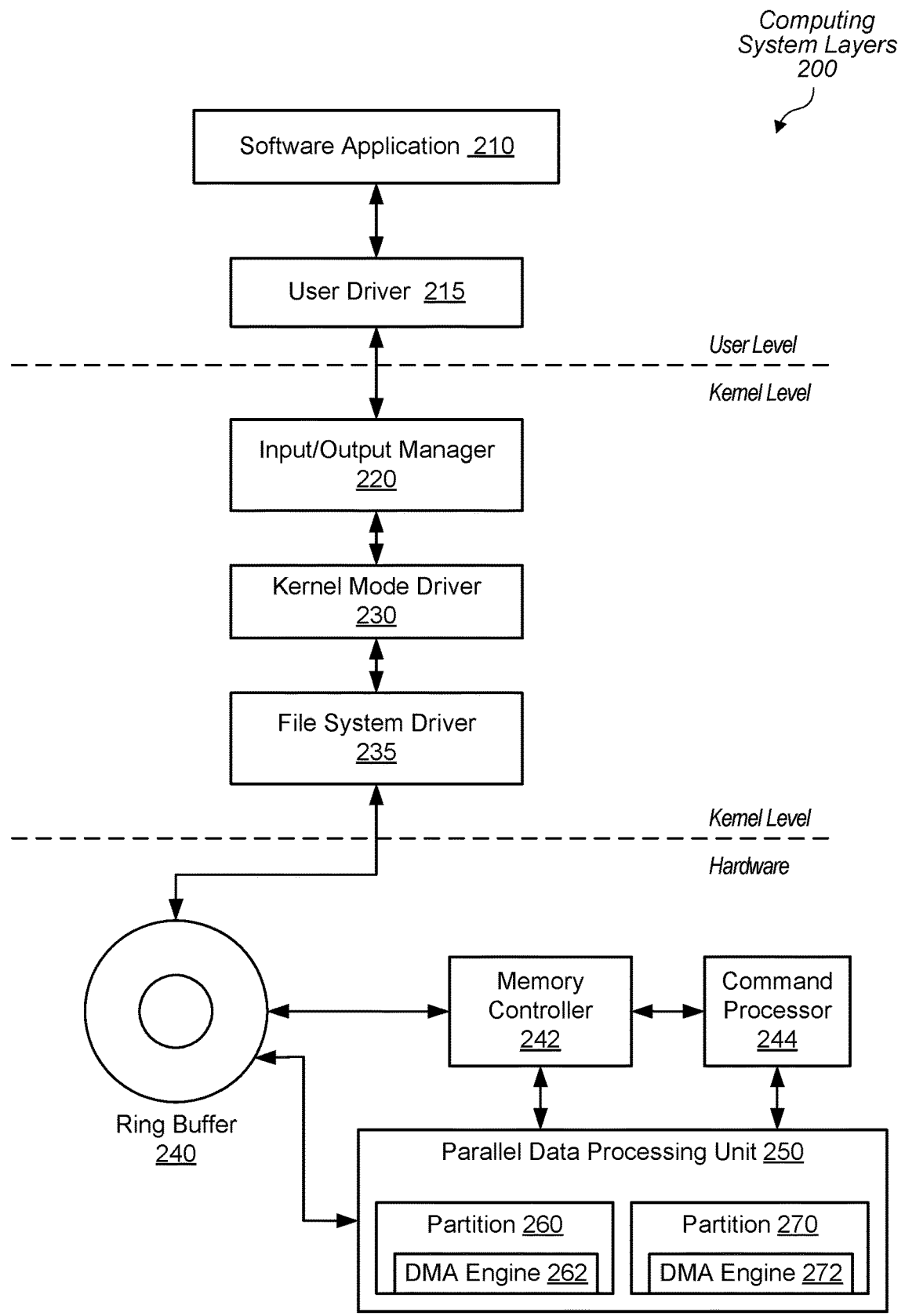
FIG. 2 is a generalized diagram of one embodiment of a software and hardware layering model.

Turning now to FIG. 2, one embodiment of a software and hardware layering model 200 for a computing system is shown. As shown, model 200 uses a collection of user mode components, kernel mode components and hardware. A layered driver model, such as model 200, is one manner to process the application 210 and I/O requests. In this model, circuitry that processes the instructions of each driver is responsible for processing a part of a request. If the request cannot be completed, information for the lower driver in the stack is set up and the request is passed along to that driver. Such a layered driver model allows functionality to be dynamically added to a driver stack. It also allows each driver to specialize in a particular type of function and decouples it from having to know about other drivers.

In various embodiments, the software application 210 is a computer program written by a developer in one of a variety of high-level programming languages such as such as C, C++, FORTRAN, and Java and so on. In some embodiments, the software application 210 begins being processed on a general-purpose processing unit such as a CPU. A graphics library uses the user driver 215 to translate function calls in the application 210 to commands particular to a piece of hardware, such as a particular graphics processing unit (GPU), and send the translated commands to the kernel mode driver 230. In various embodiments, the parallel data processing unit 250 is the particular GPU.

The computer program in the chosen higher-level language is partially processed with the aid of graphic libraries with their own application program interfaces (APIs). Platforms such as OpenCL (Open Computing Language), OpenGL (Open Graphics Library) and OpenGL for Embedded Systems (OpenGL ES), are used for running programs on GPUs from AMD, Inc. In some embodiments, developers use OpenCL for simultaneously processing the multiple data elements of the scientific, medical, finance, encryption/decryption and other computations while using OpenGL and OpenGL ES for simultaneously rendering multiple pixels for video graphics computations. In one example, the OpenCL platform defines execution queues and each queue is associated with an OpenCL device. In some implementations, an OpenCL device is either a general-purpose central processing unit (CPU) or a GPU. Function calls are referred to as OpenCL compute kernels, or simply "compute kernels". A software programmer schedules the compute kernels in the execution queues. A compute kernel is matched with one or more records of data to produce one or more work units of computation, each work unit with a unique identifier (ID).

The work units are assigned to compute units such as compute units 140A-140C (of FIG. 1). Further, DirectX is a platform for running programs on GPUs in systems using one of a variety of Microsoft operating systems.

In some embodiments, the translated commands are sent to the kernel mode driver 230 via the input/output (I/O) driver 220. In one embodiment, an I/O control system call interface is used. Although a single driver, the input/output (I/O) driver 220, is shown, multiple drivers exist in a stack of drivers between the application 210 and a piece of hardware for processing a request targeted at the piece of hardware. In other embodiments, the translated commands are directly sent to the kernel mode driver 230. In various embodiments, the kernel mode driver 230 redirects I/O requests to the driver managing the target device object, such as file system driver 235 for a memory.

The file system driver 235 provides a means for the application 210 to send information, such as the translated commands, to storage media such as the ring buffer 240 on system memory. These requests are dispatched to the file system driver 235 via circuitry executing the I/O manager 220 or the kernel mode driver 230. In some embodiments, the user driver 215 ensures only one process sends translated commands to the hardware of the parallel data processing unit 250 at a time by using the locking primitives. In some embodiments, the circuitry executing the user driver 215 sends command groups to circuitry executing the kernel mode driver 230. The command groups are a set of commands to be sent and processed atomically. The circuitry executing the kernel mode driver 230 sends the command group to the ring buffer 240 in the hardware layer via the file system driver 235.

The circuitry of the memory controller 242 in the hardware layer accesses the command group stored in the ring buffer 240. The command processor 244 uses interfaces to the memory controller 242 for accessing the commands stored on the ring buffer 240. The command processor 244 schedules the retrieved commands based on a task type of the commands. For example, the command processor 244 schedules the retrieved commands to one of the partitions 260 and 270 of the parallel data processing unit 250. The partitions 260 and 270 have dedicated direct memory access (DMA) engines 262 and 272. In some embodiments, the partitions 260 and 270 include components described earlier for partitions 110 and 150 (of FIG. 1). Each of partitions 260 and 270 is capable of accessing data stored in the ring buffer 240 independently of one another and independently of memory controller 242.

In an example, the partitions 260 and 270 have already transitioned to using low performance operating parameters and/or have already disconnected from one or more of the transitioning clock signal and power supply reference. The command processor 244 retrieves commands of a task, such as a function call, and determines the task has a task type corresponding to the partition 270 such as a non-real-time data processing task type. The command processor 244 assigns the task to the partition 270, and the partition 270 transitions to using higher performance operating parameters. In addition, any reconnections of one or more of the transitioning clock signal and power supply reference for the partition 270 are performed. The partition 260 maintains the low performance operating parameters and/or the disconnections of one or more of the transitioning clock signal and power supply reference. Since the partition 270 has its own dedicated DMA engine 272, the partition 270 does not rely on the DMA engine 262 of partition 260. Accordingly, the partition 260 remains powered down due to remaining idle, and power consumption of the parallel data processing unit 250 is reduced.

Figure 3:
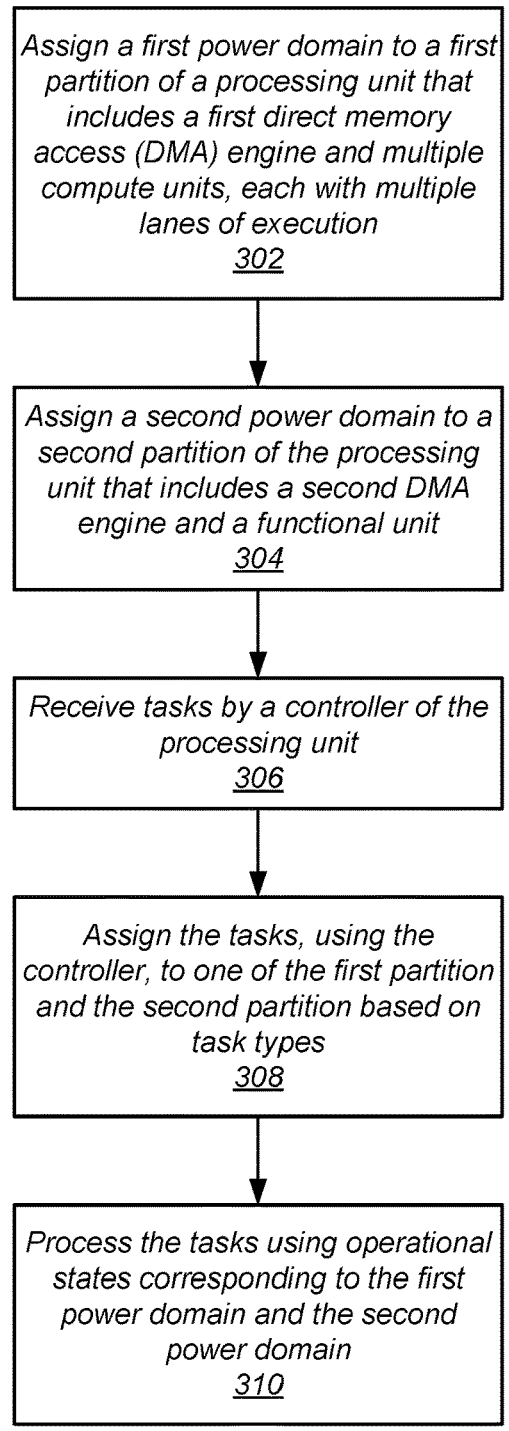
FIG. 3 is a generalized diagram of one embodiment of a method for efficiently managing power consumption of a processing unit.

Referring now to FIG. 3, one embodiment of a method 300 for efficiently managing power consumption of a processing unit is shown. For purposes of discussion, the steps in this embodiment (as well as in FIG. 5) are shown in sequential order. However, in other embodiments some steps occur in a different order than shown, some steps are performed concurrently, some steps are combined with other steps, and some steps are absent. Method 300 (as well as method 500) described below are used for power management of an apparatus such as a processing unit. Any of the described apparatuses, processing units, and systems may be used to implement the steps of method 300 (as well as method 500). A further description of these steps is provided in the below discussion.

A first power domain is assigned to a first partition of a processing unit that includes a first direct memory access (DMA) engine and multiple compute units, each with multiple lanes of execution (block 302). A second power domain is assigned to a second partition of the processing unit that includes a second DMA engine and a functional unit different from the compute unit (block 304). A controller of the processing unit receives tasks (block 306). In some embodiments, the processing unit is a graphics processing unit (GPU) and the controller is a command processor of the GPU. The controller assigns the tasks to one of the first partition and the second partition based on task types (block 308). The processing unit processes the tasks using operational states corresponding to the first power domain and the second power domain (block 310).

Figure 4:
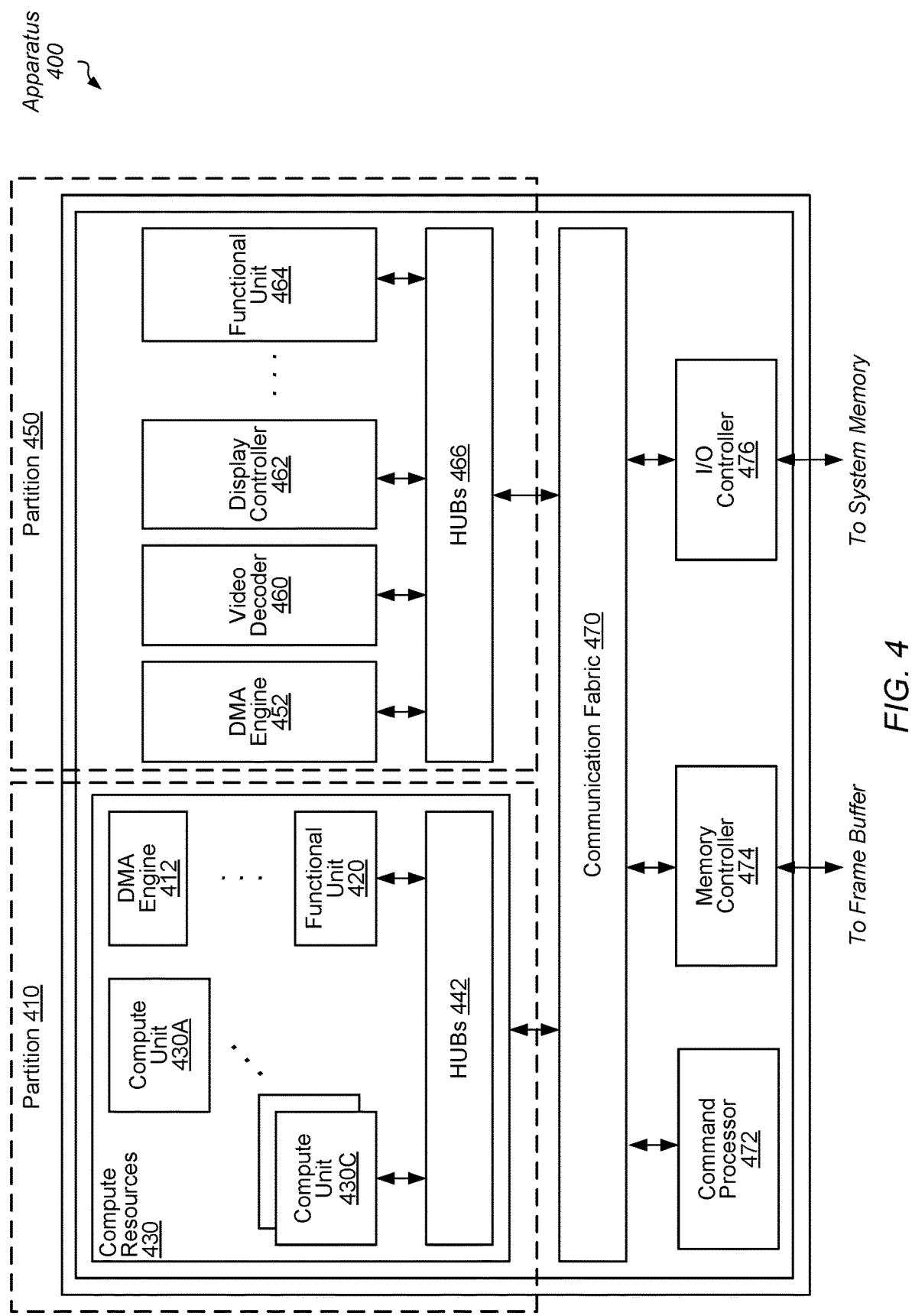
FIG. 4 is a generalized diagram of an apparatus that efficiently manages power consumption.

Referring to FIG. 4, a generalized block diagram of one embodiment of an apparatus 400 that efficiently manages power consumption is shown. As shown, the apparatus 400 includes a communication fabric 470, a command processor 472, a memory controller 474, an input/output (I/O) controller 476, and two partitions such as partition 410 and partition 450, each assigned to a respective power domain. A power controller (integrated or external), a secure processor, and phase locked loops (PLLs) or other clock generating circuitry are not shown for ease of illustration. Each of the power domains includes at least operating parameters such as at least an operating power supply voltage and an operating clock frequency. Each of the power domains also includes control signals for enabling and disabling connections to clock generating circuitry and a power supply reference. In an embodiment, the functionality of the apparatus 400 is included as one die of multiple dies on a system-on-a-chip (SOC). In various embodiments, the apparatus 100 is used in a desktop, a portable computer, a mobile device, a server, a peripheral device, or other.

The circuitry of the DMA engine 412 and the DMA engine 452 provides the same functionality as the DMA engine 112 (of FIG. 1). The circuitry of the compute units 430A-430C provides the same functionality as the compute units 140A-140C (of FIG. 1). Partition 410 uses a data parallel micro-architecture that provides high instruction throughput for a first task type such as computationally intensive tasks. This micro-architecture uses the compute units 430A-430C to complete these tasks. Partition 410 also uses functional unit 420, which represent one of a variety of intellectual property (IP) blocks and other units used for transferring source data, intermediate data and result data between the compute units 430A-430C and other circuitry such as register files, caches, DMA engine 412, and hubs 442. Examples of the tasks of the first task type assigned by the command processor 472 to partition 410 are real-time simultaneous processing of multiple data elements for scientific, medical, finance, encryption/decryption computations, and rendering multiple pixels, image blending, pixel shading, vertex shading, and geometry shading.

The partition 450 uses one or more functional units 460-464 different than any of the compute units 430A-430C used in the partition 410. For example, in some implementations, the partition 450 includes the video decoder 460, the display controller 462, and the functional unit 464, which represents one of a variety of other units. The partition 450 processes tasks of a second task type such as non-real-time tasks. Examples of tasks of the second task type assigned to the second partition are multimedia playback, such as a video decoding for encoded audio/video streams, image scaling, image rotating, color space conversion, power up initialization, background processes such as garbage collection, and so forth.

In some implementations, the circuitry of the hubs 442 and 466 support communication and interfacing with the communication fabric 470. Each of the hubs 442 and 466 includes control circuitry and storage elements for handling data transfer according to various communication protocols. The communication fabric 470 supports the transfer of memory read requests, memory write requests, memory snoop (probe) requests, token or credit messages, coherency probes, interrupts, address translation requests, and other types of messages between sources and destinations. Examples of interconnections in the communication fabric 470 are bus architectures, crossbar-based architectures, point-to-point connections, network-on-chip (NoC) communication subsystems, and so forth.

Although a single memory controller 474 and a single input/output (I/O) controller 476 is shown, in other implementations apparatus 400 includes multiple memory controllers with each supporting one or more memory channels and multiple I/O controllers. I/O controller 476 also includes circuitry for interfacing with one of a variety of peripheral devices and external processing units. Memory controller 474 and I/O controller 476 include circuitry for grouping requests to be sent to memory such as a frame buffer or system memory, supporting data transfers with burst modes, generating and handling or reporting interrupts, storing requests and responses, and supporting one or more communication protocols. In some implementations, the system memory includes any of a variety of random access memories (RAMs). Although not shown, memory controller 474, I/O controller 476, or another controller provides access to non-volatile memory used to store data at a lower level of the memory hierarchy than a frame buffer and system memory. Examples of the non-volatile memory are hard disk drives (HDDs), solid-state drives (SSDs), and so forth used to implement main memory.

In an example, the partitions 410 and 450 have already transitioned to using low performance operating parameters and/or have already disconnected from one or more of the transitioning clock signal and power supply reference. The command processor 472 retrieves commands of a task, such as a function call, and determines the task has a task type corresponding to the partition 450 such as a non-real-time data processing task type. The command processor 472 assigns the task to the partition 450, and the partition 450 transitions to using higher performance operating parameters. In addition, any reconnections of one or more of the transitioning clock signal and power supply reference for the partition 450 are performed. The partition 410 maintains the low performance operating parameters and/or the disconnections of one or more of the transitioning clock signal and power supply reference. Since the partition 450 has its own dedicated DMA engine 452, the partition 450 does not rely on the DMA engine 412 of partition 410. Accordingly, the partition 410 remains powered down due to remaining idle, and power consumption of the apparatus 400 is reduced.

Figure 5:
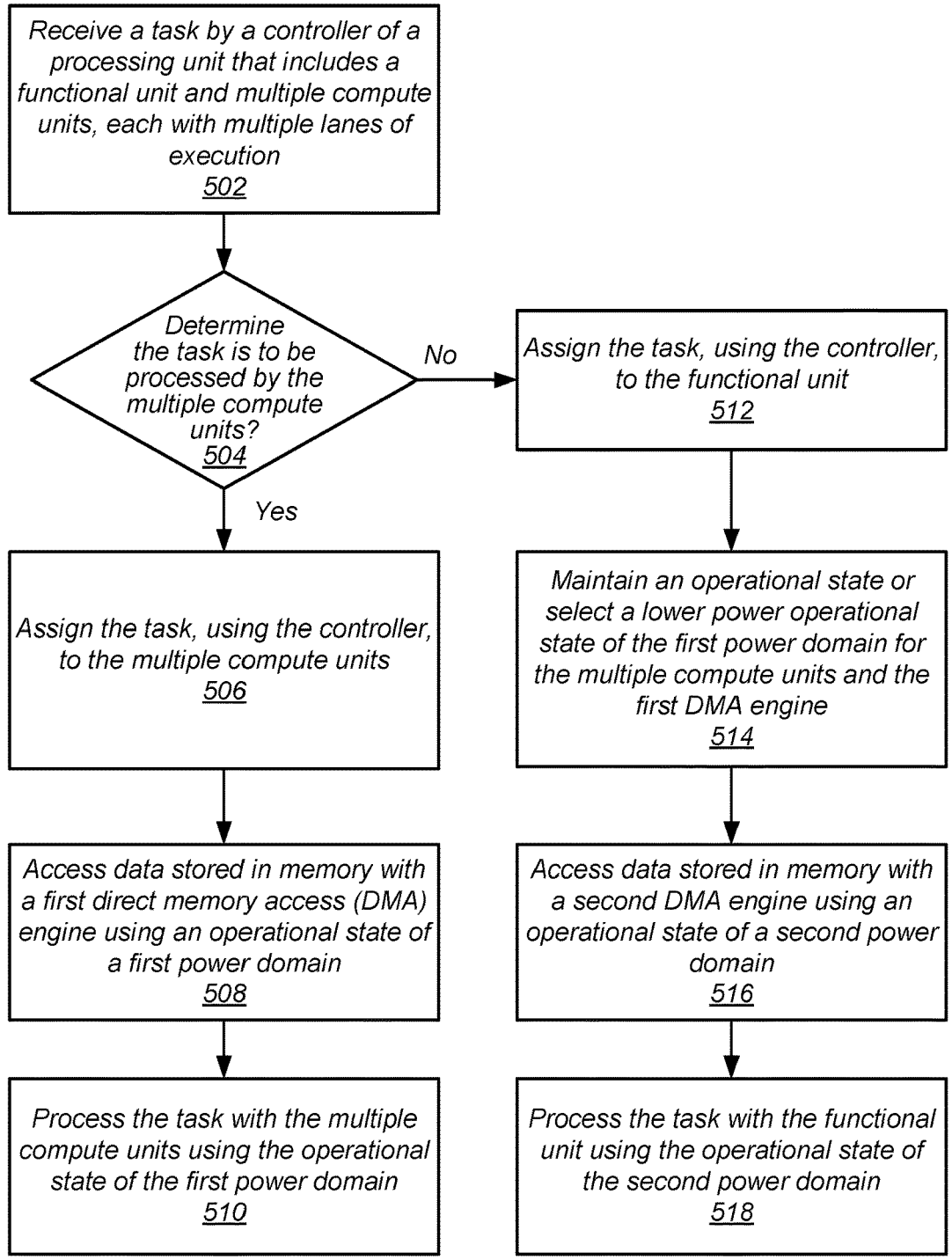
FIG. 5 is a generalized diagram of one embodiment of a method for efficiently managing power consumption of a processing unit.

Turning now to FIG. 5, one embodiment of a method 500 for efficiently managing power consumption of a processing unit is shown. A controller of a processing unit receives a task where the processing unit includes a functional unit and multiple compute units, each with multiple lanes of execution (block 502). In various embodiments, the processing unit is a graphics processing unit (GPU) and the controller is a command processor of the GPU. The processing unit includes a first partition that uses operating parameters of a first power domain and a second partition that uses operating parameters of a second power domain. In some embodiments, the first partition includes the multiple compute units and a first direct memory access (DMA) engine. The first DMA engine transfers data between external memory and components of the first partition such as the multiple compute units. The second partition includes the functional unit different from a compute unit of the multiple compute units and a second DMA engine. The second DMA engine transfers data between external memory and components of the second partition such as the functional unit.

If the controller determines the task is to be processed by the multiple compute units ("yes" branch of the conditional block 504), then the controller assigns the task to the multiple compute units (block 506). For example, the controller assigns the task to the first partition. The processing unit accesses data stored in memory with the first DMA engine using an operational state of a first power domain (block 508). The multiple compute units process the task using the operational state of the first power domain (block 510).

If the controller determines the task is to be processed by the functional unit ("no" branch of the conditional block 504), then the controller assigns the task to the functional unit (block 512). For example, the controller assigns the task to the second partition. The controller maintains an operational state or selects a lower power operational state of the first power domain for the multiple compute units and the first DMA engine (block 514). The processing unit accesses data stored in memory with the second DMA engine using an operational state of a second power domain (block 516). The functional unit processes the task using the operational state of the second power domain (block 518).

Figure 6:
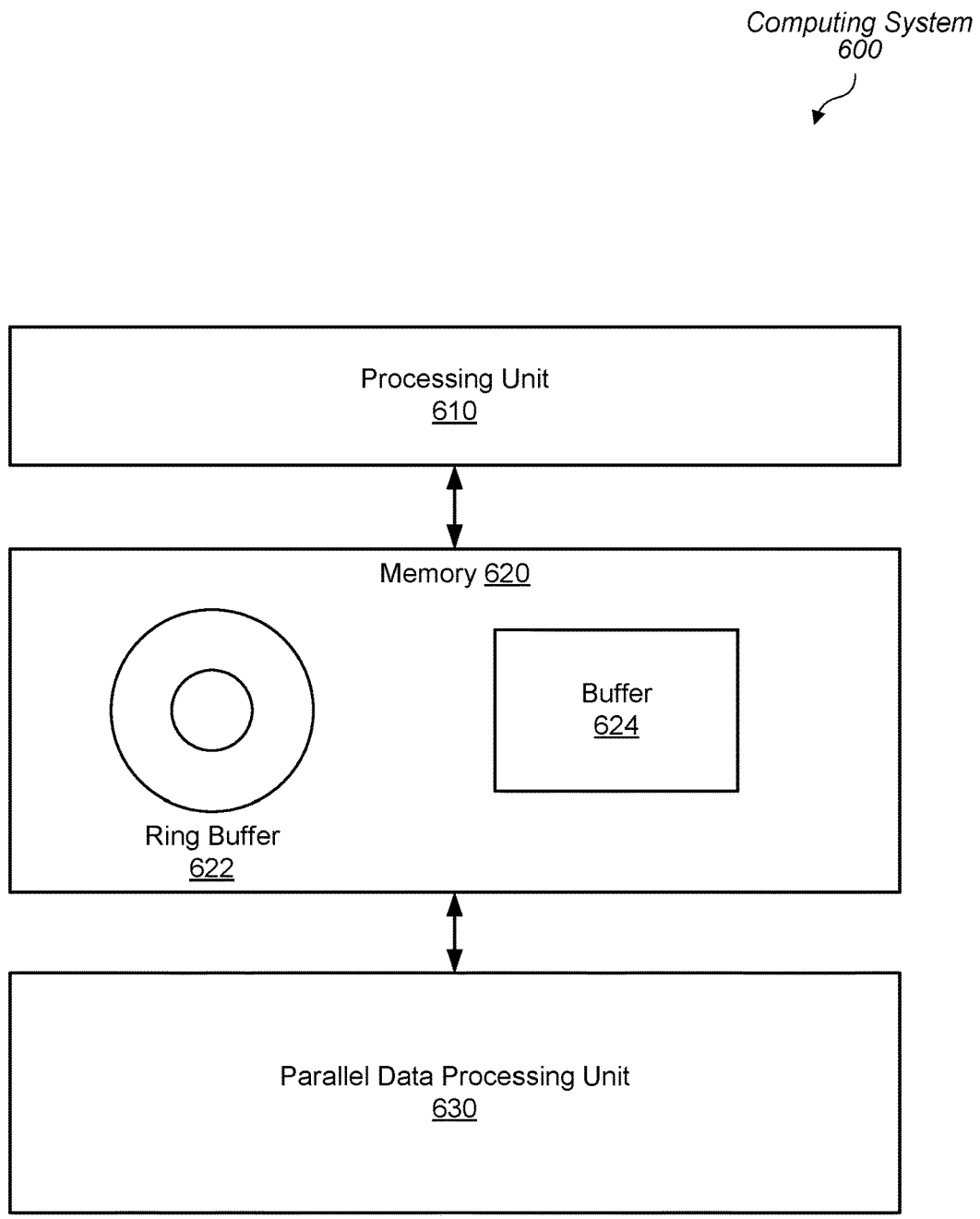
FIG. 6 is a generalized diagram of computing system with a processing unit that efficiently manages power consumption.

Turning now to FIG. 6, one embodiment of a computing system 600 is shown. As shown, the computing system 600 includes a processing unit 610, a memory 620 and a parallel data processing unit 630. In some embodiments, the functionality of the computing system 600 is included as components on a single die, such as a single integrated circuit. In other embodiments, the functionality of the computing system 600 is included as multiple dies on a system-on-a-chip (SOC). In various embodiments, the computing system 600 is used in a desktop, a portable computer, a mobile device, a server, a peripheral device, or other.

The circuitry of the processing unit 610 processes instructions of a predetermined algorithm. The processing includes fetching instructions and data, decoding instructions, executing instructions and storing results. In one embodiment, the processing unit 610 uses one or more processor cores with circuitry for executing instructions according to a predefined general-purpose instruction set. In various implementations, the processing unit 610 is a central processing unit (CPU). The parallel data processing unit 630 includes the circuitry and the functionality of the apparatus 100 (of FIG. 1), the parallel data processing unit 250 (of FIG. 2), and the apparatus 400 (of FIG. 4).

In various embodiments, threads are scheduled on one of the processing unit 610 and the parallel data processing unit 630 in a manner that each thread has the highest instruction throughput based at least in part on the runtime hardware resources of the processing unit 610 and the parallel data processing unit 630. In some embodiments, some threads are associated with general-purpose algorithms, which are scheduled on the processing unit 610, while other threads are associated with parallel data computationally intensive algorithms such as video graphics rendering algorithms, which are scheduled on the parallel data processing unit 630.

Some threads, which are not video graphics rendering algorithms, still exhibit parallel data and intensive throughput. These threads have instructions which are capable of operating simultaneously with a relatively high number of different data elements. Examples of these threads are threads for scientific, medical, finance and encryption/decryption computations. These threads were traditionally scheduled on the processing unit 610. However, the high parallelism offered by the hardware of the parallel data processing unit 630 and used for simultaneously rendering multiple pixels, is capable of also simultaneously processing the multiple data elements of the scientific, medical, finance, encryption/decryption and other computations.

To change the scheduling of the above computations from the processing unit 610 to the parallel data processing unit 630, software development kits (SDKs) and application programming interfaces (APIs) were developed for use with widely available high-level languages to provide supported function calls. The function calls provide an abstraction layer of the parallel implementation details of the parallel data processing unit 630. The details are hardware specific to the parallel data processing unit 630 but hidden to the developer to allow for more flexible writing of software applications. The function calls in high level languages, such as C, C++, FORTRAN, and Java and so on, are translated to commands which are later processed by the hardware in the parallel data processing unit 630. Although a network interface is not shown, in some embodiments, the parallel data processing unit 630 is used by remote programmers in a cloud computing environment. Cloud service providers sell the use of the compute resources 170 of the parallel data processing unit 630 as a service.

In various embodiments, the computing system 600 uses the software and hardware layering model 200 (of FIG. 2). For example, a software application begins execution on the processing unit 610. Function calls within the application are translated to commands by a given API. The processing unit 610 sends the translated commands to the memory 620 for storage in the ring buffer 622. The commands are placed in groups referred to as command groups. In some embodiments, the processing units 610 and 630 use a producer-consumer relationship, which is also be referred to as a client-server relationship. The processing unit 610 writes commands into the ring buffer 622. Then the parallel data processing unit 630 reads the commands from the ring buffer 622, processes the commands, and writes result data to the buffer 624. The processing unit 610 is configured to update a write pointer for the ring buffer 622 and provide a size for each command group. The parallel data processing unit 630 updates a read pointer for the ring buffer 622 and indicates the entry in the ring buffer 622 at which the next read operation will use.

In various embodiments, the parallel data processing unit 630 reduces power consumption of the computing system 600 by using two or more dedicated DMA engines in two or more partitions. For example, a first partition maintains low performance operating parameters and/or disconnections of one or more of the transitioning clock signal and power supply reference while a second partition processes an assigned task. Since the second partition has its own dedicated DMA engine, the second partition does not rely on the DMA engine of first partition. Accordingly, the first partition remains powered down due to remaining idle, and power consumption of the computing system 600 is reduced.

It is noted that one or more of the above-described embodiments include software.

In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a first direct memory access (DMA) engine comprising circuitry configured to transfer data between an external memory and a first partition of the processor that provides a first functionality, wherein the first partition is in a first power domain;
a second direct memory access (DMA) engine comprising circuitry configured to transfer data between the external memory and a second partition of the processor, wherein the second partition is configured to provide a second functionality different from the first functionality, wherein the second partition is in a second power domain that is independent of the first power domain; and
control circuitry configured to receive a task and, based on a type of the task, assign the task to either the first partition or the second partition for execution, wherein the first and second partitions operate independently and concurrently under respective power domains and respective DMA engines.

2. The processor as recited in claim 1, wherein responsive to a first task having a first task type, the circuitry is configured to:
transition one or more of operating parameters and control signals of the first power domain to cause the first partition to consume less power; and
execute the first task by the second partition.

3. The processor as recited in claim 2, wherein:
the circuitry is configured to cause the second DMA engine to process the first task.

4. The processor as recited in claim 2, wherein:
the first task type is a non-real-time data processing task type executable by circuitry of the second partition; and
the first partition comprises circuitry configured to execute a second task type, wherein the second task type is a real-time data processing task type.

5. The processor as recited in claim 1, wherein: functionality of the processor is included as a semiconductor die of multiple dies on a system-on-a-chip (SOC).

6. The processor as recited in claim 4, wherein the circuitry is further configured to:
responsive to a second task having the second task type:
transition the one or more of the operating parameters and the control signals of the first power domain to cause the first partition to consume more power; and
execute the second task by the first partition that utilizes the first DMA engine to process the second task.

7. The processor as recited in claim 4, wherein:
the first task type is a multimedia playback task; and
the second task type is a graphics shader task.

8. A method comprising:
responsive to a given task to be executed:
causing, by a processing circuitry, a first partition of a processor to access data stored in an external memory with a first DMA engine using operating parameters of a first power domain; and
executing, by the processing circuitry, using one or more functional units of the first partition, the given task using the operating parameters of the first power domain; and
during execution of the given task, causing, by the processing circuitry, a second partition of the processor to access data stored in the external memory with a second DMA engine using operating parameters of a second power domain different from the first power domain.

9. The method as recited in claim 8, wherein responsive to the given task having a first task type, the method further comprises:
executing, by the processing circuitry, the given task using one or more functional units of the second partition using operating parameters of the second power domain; and
during execution of the given task, transitioning, by the processing circuitry, one or more of the operating parameters of the first power domain to cause the first partition to consume less power.

10. The method as recited in claim 9, further comprising causing, by the processing circuitry, the second DMA engine to process the given task.

11. The method as recited in claim 9, wherein
the first task type is a non-real-time data processing task type executable by one or more functional units of the second partition and the method further comprising causing, by the processing circuitry, the one or more functional units of the first partition to execute a second task type, wherein the second task type is a real-time data processing task type.

12. The method as recited in claim 8, wherein functionality of the processor is included as a semiconductor die of multiple dies on a system-on-a-chip (SOC).

13. The method as recited in claim 11, further comprising:
responsive to a second task having the second task type:
transitioning, by the processing circuitry, one or more of the operating parameters of the first power domain to cause the first partition to consume more power; and
executing, by the processing circuitry, the given task using the first DMA engine.

14. The method as recited in claim 11, wherein:
the first task type is a multimedia playback task; and
the second task type is a graphics shader task.

15. A computing system comprising:
a memory subsystem configured to store instructions of one or more tasks; and
a processing circuit coupled to the memory subsystem, wherein the processing circuit comprises:
a first partition that includes a first direct memory access (DMA) engine comprising circuitry configured to transfer data between an external memory and the first partition;
a second partition that includes a second DMA engine comprising circuitry configured to transfer data between the external memory and the second partition; and
circuitry configured to:
cause the first partition to access data stored in the external memory with the first DMA engine using operating parameters of a first power domain;
execute, using one or more functional units of the first partition, a given task using the operating parameters of the first power domain; and
during execution of the given task, cause the second partition to access data stored in the external memory with the second DMA engine using operating parameters of a second power domain different from the first power domain.

16. The computing system as recited in claim 15, wherein responsive to the given task having a first task type, the circuitry is further configured to:

execute the given task using one or more functional units of the second partition using operating parameters of the second power domain; and during execution of the given task, transition one or more of operating parameters of the first power domain to cause the first partition to consume less power.

17. The computing system as recited in claim 16, wherein the circuitry is configured to cause the second DMA engine to process the given task.

18. The computing system as recited in claim 16, wherein:
the first task type is a non-real-time data processing task type executable by one or more functional units of the second partition; and
the one or more functional units of the first partition are configured to execute a second task type, wherein the second task type is a real-time data processing task type.

19. The computing system as recited in claim 15, wherein functionality of the processing circuit is included as a semiconductor die of multiple dies on a system-on-a-chip (SOC).

20. The computing system as recited in claim 18, wherein the circuitry is further configured to:
responsive to the given task having the second task type:
transition one or more of the operating parameters of the first power domain to cause the first partition to consume more power; and
execute the given task by the using the first DMA engine.

* * * * *